2,323,732

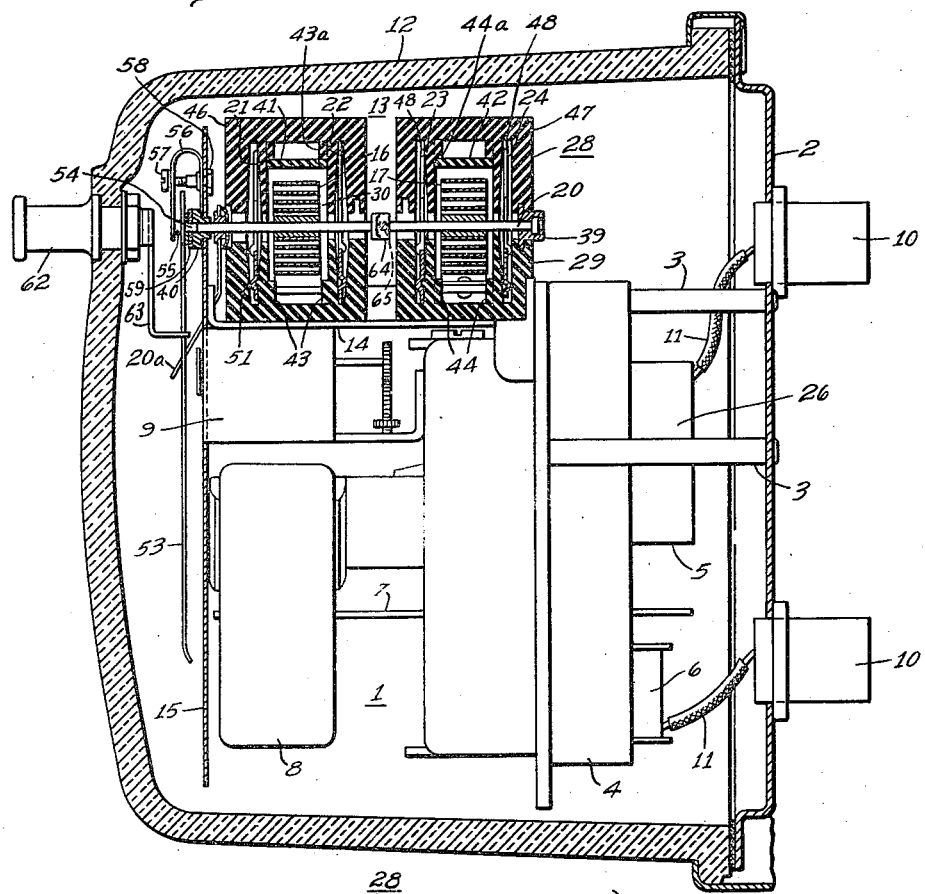
Fig. 1.
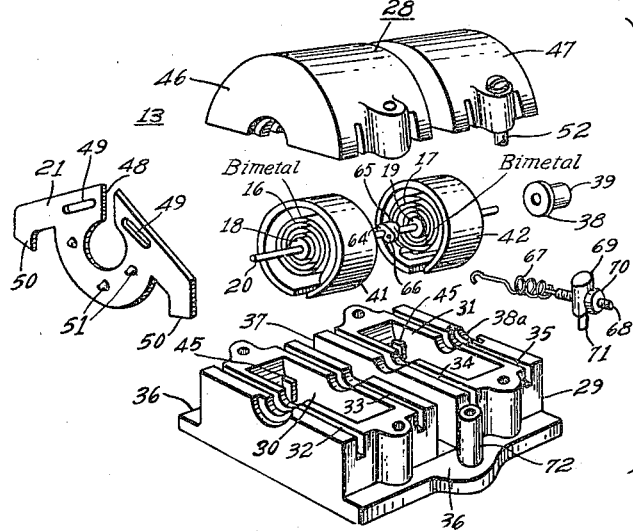
Fig. 3.
INVENTOR
Benjamin H. Smith.
BY 
ATTORNEY July 6, 1943.  B. H. SMITH  2,323,732
THERMAL DEMAND METERS
Filed May 14, 1941   2 Sheets-Sheet 2
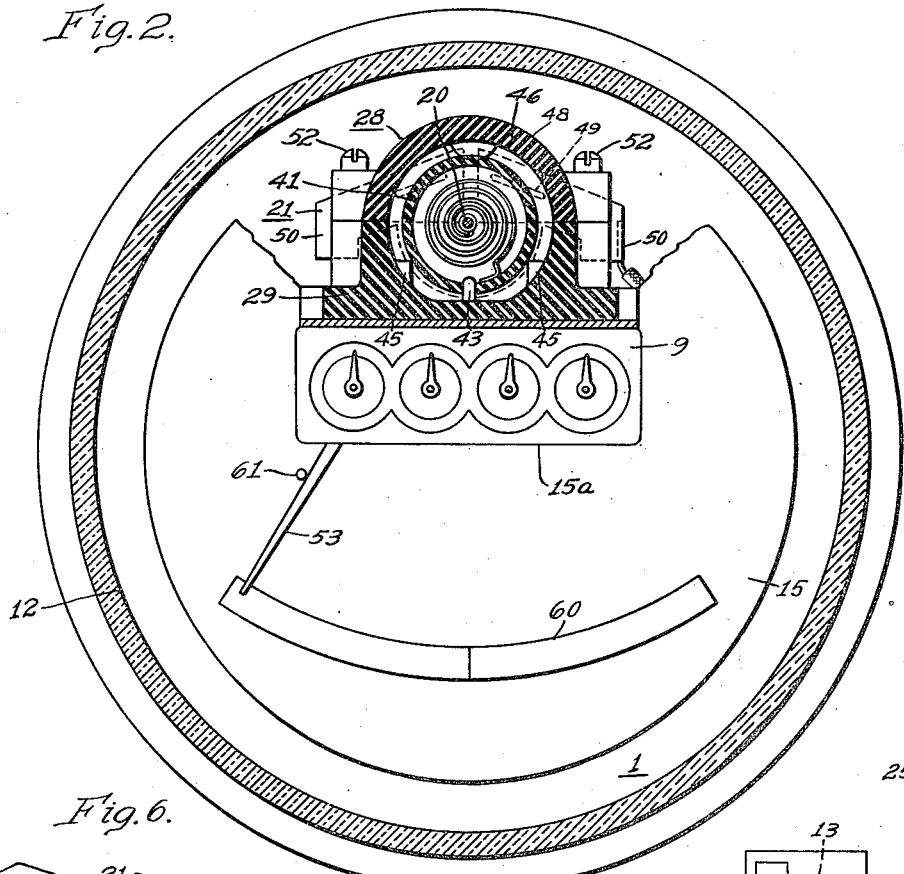
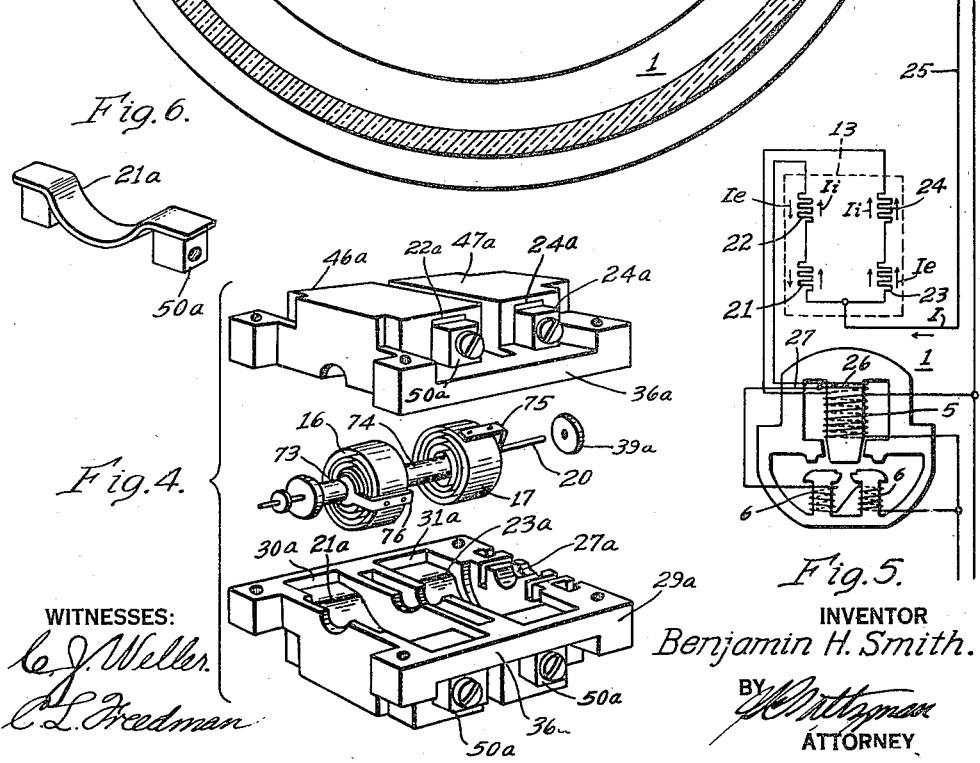
WITNESSES:
C. J. Weller.
C. L. Freedman.
INVENTOR
Benjamin H. Smith.
BY
ATTORNEY Patented July 6, 1943

UNITED STATES PATENT OFFICE 2,323,732

THERMAL DEMAND METER

Benjamin H. Smith, Bloomfield, N. J., assignor to Westinghouse Electric & Manufacturing Company, East Pittsburgh, Pa., a corporation of Pennsylvania Application May 14, 1941, Serial No. 393,343

15 Claims. (Cl. 171—34)

This invention relates to measuring instruments and it has particular relation to measuring instruments for both measuring the maximum demand of, and integrating, electrical energy.

Maximum demand devices employed commercially fall into two general classes. These classes are known as block interval and time lagged classes. In the block interval maximum demand device, the maximum demand pointer moves across its scale at a constant rate when the maximum demand device is subjected to a constant load. When a time lagged maximum demand device is subjected to a constant load, the maximum demand pointer moves across its scale with a speed which diminishes in accordance with the time of deflection. Generally, the rate of diminution of the speed of the pointer in a time lagged maximum demand device is a logarithmic or exponential function. Examples of the block interval and time lagged maximum demand devices are shown respectively in the patents to R. H. Lewis. et al. No. 2,047,376 and B. H. Smith No. 1,417,695, both of which are assigned to the Westinghouse Electric & Manufacturing Company.

The time lagged maximum demand measuring device closely follows the heating and cooling curves of electrical apparatus. For this and other reasons, such a device is often desirable.

Prior art maximum demand devices of the thermal time lagged type have required extremely intricate and tedious assembly. Not only does such a construction contribute to the initial cost of the device, but it greatly complicates the problems encountered in servicing such devices. Moreover, it has been customary to enclose the thermal maximum demand device in a casing separate from that enclosing an integrating watthour meter. The provision of separate casings for these instrumentalities substantially increases the space requirements thereof.

In accordance with the invention, a thermal maximum demand device is enclosed with a measuring instrument such as an integrating watthour meter in a common casing. Preferably the maximum demand device is energized in part from the electromagnet of the watthour meter. With such a construction, the heat generated by the watthour meter in its operation may be employed for compensating certain errors present in the maximum demand device. This may be illustrated by assuming that the maximum demand device is asymmetrically positioned relative to the watthour meter. Since the maximum demand device contains two thermal responsive actuating elements, the asymmetrical positioning thereof results in the application of a major proportion of the watthour meter heat to only one of the actuating elements. Consequently, by proper positioning of the maximum demand device, it is possible to control in some degree the operating characteristics thereof.

The invention further contemplates an improved construction for the thermal maximum demand device. To this end, a housing is provided which includes a base portion and a cover portion. Upon removal of the cover portion, the thermal responsive actuating elements and their associated structure readily may be removed as a unit from the housing. Preferably, the base portion of the housing is formed as a single unit in order to reduce cost and to assure alignment of the various parts of the maximum demand device.

It is, therefore, an object of the invention to provide an improved measuring device including a measuring instrument and a maximum demand device.

It is a further object of the invention to provide a common casing for a watthour meter and a thermal maximum demand device.

It is a still further object of the invention to provide a measuring device wherein a thermal maximum demand device is positioned asymmetrically in the path of heat developed by a watthour meter.

It is an additional object of the invention to provide an improved thermal maximum demand device.

It is another object of the invention to provide a thermal maximum demand device having readily accessible parts.

Other objects of the invention will be apparent from the following description, taken in conjunction with the accompanying drawings, in which:

Figure 1 is a sectional view, in side elevation, of a measuring device embodying the invention;

Fig. 2 is a view, in front elevation, with parts broken away of the device illustrated in Fig. 1;

Fig. 3 is an exploded view in perspective of a maximum demand device embodying the invention;

Fig. 4 is an exploded view in perspective of a maximum demand device representing a modified form of the invention;

Fig. 5 is a schematic view showing circuit connections for the device illustrated in Figs. 1 and 2; and Fig. 6 is a detail view in perspective of one of the heaters employed in the modification shown in Fig. 4.

Referring to the drawings, Figure 1 shows a measuring instrument, such as an alternating current watthour meter 1, attached to a base plate 2 by means of suitable pillars 3. The watthour meter may be of generally conventional construction, including an electromagnet 4 having a voltage winding 5 and current windings 6 which cooperate when energized to produce a shifting magnetic field. An electroconductive armature or disc 7 is positioned for rotation in the field produced by the voltage and current windings. Rotation of the armature 7 is retarded by a braking magnet 8. A conventional register 9 may be associated with the armature 7 for integrating the rotation thereof. Preferably, the register is detachably associated with the watthour meter 1, a suitable construction for this purpose being shown in the Miller et al. Patent 1,598,489, which is assigned to the Westinghouse Electric & Manufacturing Company.

The casing for the watthour meter 1 may vary appreciably in construction. In the specific embodiment illustrated in Fig. 1, the casing is designed to provide a detachable watthour meter. For this purpose, the base plate 2 is provided with contact blades 10 which extend through the base plate but are insulated therefrom. These contact blades are connected to the voltage and current winding through suitable conductors 11. The casing also includes a cover 12 which may be of glass. This cover is detachably associated wtih the base plate 2. It will be understood that the watthour meter 1 is designed to be mounted on a watthour meter socket with the contact blades 10 engaging contact jaws positioned within the socket (not shown). A suitable construction for the casing and the socket of a detachable watthour meter is shown in the Bradshaw et al. Patent 1,969,499, which is assigned to the Westinghouse Electric & Manufacturing Company.

In order to measure the maximum demand of electrical energy supplied through the watthour meter 1, a maximum demand measuring device 13 is associated with the watthour meter 1 within the same cover 12. This device may be mounted on a shelf 14 which is attached to a face plate 15 and to the watthour meter 1. Preferably the face plate 15 is provided with an opening 15a through which the integrating register 9 is exposed and through which the register may be moved readily for attachment, servicing or replacement.

The exact construction of the maximum demand measuring device 13 may vary appreciably but in the specific embodiment illustrated in Figs. 1, 2 and 3, the device includes two bimetallic spiral springs 16 and 17 which have their inner ends attached to hubs 18 and 19. These hubs are fixed to a common shaft 20 which carries a pusher arm 20a for rotation therewith. It will be understood that a bimetallic spring is formed of two dissimilar metals or alloys having different coefficients of thermal expansion. Consequently, when each of the bimetallic springs is heated, its inner end tends to rotate relative to the outer end. The outer ends of the bimetallic springs 16 and 17 are fixed in permanent positions by means which will be described below.

For controlling the temperature of the bimetallic springs 16 and 17, four heaters 21, 22, 23 and 24 are associated therewith. Each of the bimetallic springs is heated by one pair of heaters, as clearly illustrated in Fig. 1.

The bimetallic springs 16 and 17 are so mounted that when heated they tend to urge the shaft 20 in opposite directions of rotation. Consequently, variations in temperature which affect both springs equally have no appreciable effect on the rotation of the shaft 20 and the pusher arm 20a associated with the shaft. This means that ambient temperature variations have little effect on the accuracy of the maximum demand measuring device.

Rotation of the shaft 20 and of the pusher arm 20a carried thereby is determined by the difference in temperatures of the bimetallic springs 16 and 17. By proper energization of the heaters, the rotation of the shaft and the pusher arm may be made dependent on energy flowing through the watthour meter 1. Connections suitable for this purpose are illustrated in Fig. 5.

Referring to Fig. 5, the voltage winding 5 and current windings 6 of the watthour meter 1 are shown associated with a circuit 25 for the purpose of measuring energy flowing therethrough. The heaters 21, 22, 23 and 24 are connected in a series circuit for energization by a current $I_e$ which varies in accordance with the voltage of the circuit 25. Although the heaters could be connected directly to the circuit or through a separate transformer, an appreciable saving in space and cost may be effected by energizing the heater from the voltage winding 5 of the watthour meter 1. For this purpose, the voltage pole of the watthour meter 1 is provided with an auxiliary secondary winding 26. This auxiliary winding 26 constitutes the secondary winding of a transformer in which the voltage winding 5 of the watthour meter is the primary winding. Consequently, the output of the secondary winding 26 may be represented by the current $I_e$ which varies in accordance with the voltage of the circuit 25.

Each of the heaters 21, 22, 23 and 24 also is heated by a current $I_1$ which varies in accordance with the current I of the circuit 25. This may be accomplished by connecting one terminal of the current winding 6 to a centrally disposed tap 27 on the secondary winding 26. By inspection of Fig. 5, it will be noted that the heaters 21 and 22 and the heaters 23 and 24 form two arms of a parallel circuit which is connected in series with the current winding 6 of the watthour meter for energization by the current I flowing in the circuit 25. Consequently, the current $I_1$ in each heater is equal to one-half of the current I flowing in the circuit 25. Instantaneous directions of the flow for the currents $I_e$ and $I_1$ are indicated by arrows in Fig. 5. It will be observed that the directions of flow are such that the currents $I_e$ and $I_1$ add vectorially in the heaters 23 and 24 and subtract vectorially in the heaters 21 and 22. Consequently, when current flows in the circuit 25, a larger resultant current flows in the heaters 23 and 24 than in the heaters 21 and 22. With a circuit as illustrated in Fig. 5, the rotation of the shaft 20 and the pusher arm 20a of the maximum demand measuring device 13 is dependent upon energy flowing in the circuit 25, as well understood in the art. Other connections for the heaters are shown in my aforesaid patent.

The operating parts of the maximum demand measuring device 13 are enclosed in suitable housing 28 which includes a base portion 29. This base portion is provided with two chambers 30 and 31 for receiving respectively the bimetallic springs 16 and 17. In addition, the base portion 29 includes four slots 32, 33, 34 and 35 for receiving respectively the heaters 21, 22, 23 and 24. Although separate housings may be employed for each of the bimetallic springs, preferably the base portion is a unitary structure wherein the chambers 30 and 31 are connected by webs 36 of restricted cross section. The restriction of the cross section is for the purpose of restricting the transmission of heat beatween two chambers. As a further guard against the transmission of heat between the chambers, the chambers are separated by a substantial air space 37. Moreover, it will be noted that the webs 36 are positioned as much below the bimetallic springs 16 and 17 as is practical. Such a positioning of the webs increases the length of the path offered to heat flowing between the two chambers and consequently serves further to reduce the heat transmission therebetween.

The base portion 29 also has a slot 38a for receiving the ring flange 38 of a bearing 39. This bearing is for the purpose of receiving one end of the shaft 20. The remaining end of the shaft 20 is positioned in a bearing 40 carried by the face plate 15.

In order to position accurately the outer ends of the bimetallic springs 16 and 17, the ends are attached, respectively, to split rings 41 and 42. These split rings may be of heat conductive material such as metal or of insulating material, such as a phenol condensation product, depending upon the particular characteristic desired. In the specific embodiment illustrated in Figs. 1, 2 and 3, it may be assumed that the split rings 41 and 42 are of an insulating material, such as a phenol formaldehyde condensation product. The attachment of the ends to the split rings may be in any suitable manner as by rivets.

To assist in positioning the split rings, the base portion 29 is provided with one or more ribs for each of the split rings. For example, ribs 43 are provided for the split ring 41 and ribs 44 are provided for the split ring 42. When each spring and its associated split ring are inserted in a chamber, the ribs 43 and 44 are received between the ends of the split ring to position the ring within the chamber. Since the ring is somewhat resilient, the ends thereof may be spaced apart by a distance normally slightly less than the corresponding dimension of the ribs. This serves to eliminate play between the ribs and ring. By inspection of Fig. 1, it will be noted that the split rings 41 and 42 serve to space the bimetallic springs 16 and 17 slightly from the walls of the chambers provided in the housing 28.

Preferably an air space is left between the outer surface of each split ring and the surface of the associated chamber in order to provide increased heat insulation for the enclosed bimetallic spring. To this end, four abutments 45 may be positioned symmetrically in the base portion for each chamber to contact the associated split ring and space it from the curved wall of the chamber.

Each of the chambers is provided with a cap 46 and 47 for completing the enclosure of each bimetallic spring. Although these caps may be associated in a unitary structure similar to the base portion 29, preferably they are completely separated in order to increase the heat insulation between the chambers. The caps 46 and 47 are provided with chambers and slots for receiving the bimetallic springs, split rings, bearing and heaters which are similar to the chambers and slots in the base portion 29. It will be noted that each of the caps includes ribs 43a and 44a which engage the outer surface of the associated split rings to complete the positioning of the rings in their respective chambers. Because of this construction, an air space is left substantially around each split ring.

The housing 28 may be constructed of various materials. Preferably the material selected is a heat and electrical insulating material, such as a phenol formaldehyde condensation product. Because of the accessible construction of the base portion 29 and the caps 46 and 47, these parts may be formed readily by a molding or casting operation. To facilitate such molding or casting, the walls of the various chambers and slots may be tapered slightly.

With the disposition of the parts as illustrated in Figs. 1 and 3, heat from the various heaters is applied uniformly to all convolutions of the spiral bimetallic springs. Each of the heaters may be formed substantially as illustrated in Fig. 3. It will be noted that each heater is substantially of U-shape, having a channel 48 communicating with a centrally disposed opening therein. Because of the aligned channels in the four heaters, the shaft 20 may be moved readily therethrough when the bimetallic spring and shaft assembly is to be inserted or removed without disturbing the connections for the heaters. If desired, slits 49 may be formed in the heaters for the purpose of increasing the resistance thereof. Moreover, each of the heaters is provided with projections 50 which project from opposite sides of the housing 28 for the purpose of receiving the electrical connections illustrated, for example, in Fig. 5.

Although the housing 28 is of a heat insulating material, it is a better conductor of heat than is air. In order to provide the best heat transmission from each heater to the associated bimetallic spring, each of the heaters preferably is urged into intimate contact with that wall of its slot which is nearest to the associated bimetallic spring. For this purpose, each of the heaters may be provided with protuberances 51 for urging the heater against the desired surface. Conveniently, the protuberances 51 may be formed by deforming portions of the heaters. With such a construction, heat developed by each heater flows directly through the thin partition between the heater and its associated bimetallic spring and then across a small air space to the bimetallic spring.

Furthermore, it will be noted that the provision of the protuberances 51 provides an air space between each heater and the outer wall of the associated base portion and cap. This air space contributes further to the insulation of the chamber for each bimetallic spring. Since an additional air space is provided external to the exterior surface of each split ring 41 or 42, it is evident that each bimetallic spring together with its heaters are surrounded substantially by an insulting air space.

The caps 46 and 47 may be secured to the base portion 29 by suitable bolts 52 which, if desired, also may be employed for securing the base portion to the shelf 14.

From the foregoing discussion, it is believed that the assembly of the maximum demand measuring device 13 is apparent. The base portion 29 is first positioned on the shelf 14. The heaters 21, 22, 23 and 24 then are dropped into their respective slots and are connected appropriately in accordance with the circuit illustrated in Fig. 5, or any other suitable circuit. The bimetallic springs 16 and 17, together with the shaft 20, the pusher arm 20a, and the rings 41 and 42 next are dropped through the channels 48 into the base portion 29 and the shaft 20 is inserted in the bearing 40. Sufficient play is available for the shaft 20 to permit this insertion in the bearing 40. Before the shaft 20 is dropped to its final position, the bearing 39 may be slipped over the remaining end of the shaft for reception in the slot 38a. With the parts so positioned, the caps 46 and 47 may be applied to the base portion 29 and attached in final position by means of the bolts 52. If for any reason, the maximum demand measuring device requires servicing or replacement, the caps 46 and 47 may be readily removed and the bimetallic springs 16 and 17, together with the shaft 20, may be removed as a unit without further disturbing the device.

The rotation of the shaft 20 may be shown in any desired manner. For example, a maximum demand pointer 53 may be mounted for rotation over the face plate 15. In the specific embodiment illustrated in Fig. 1, the pointer 53 is fixed to a stub shaft 54 which has one end partly inserted in the bearing 40. The stub shaft 54 also carries a ring flange 55 which is fixed to the stub shaft. This ring flange is urged toward the bearing 40 by means of a spring 56 which may be adjusted to exert any desired pressure by means of a screw 57. The screw 57 engages a threaded member 58 carried by the face plate 15. If desired, a friction pad, such as a felt pad 59, may be inserted between the ring flange 55 and the bearing 40 in order to assist in holding the pointer 53 in any position to which it is actuated.

A scale 60 (see Fig. 2) may be printed on the face plate 15 for cooperation with the maximum demand pointer 53. In addition, a zero stop 61 may be provided on the face plate 15 for stopping the pointer 53 in its zero or initial position. By inspection of Fig. 1, it will be noted that the pusher arm 20a projects through a slot in the face plate 15 for engagement with the maximum demand pointer 53. Consequently, the maximum demand pointer takes a position which corresponds to the maximum rotation of the shaft 20 and the pusher arm 20a during any desired period. At the end of this period, the maximum demand pointer 53 may be reset by means of a resetting knob 62 which projects through the cover 12 and which carries a spring arm 63 on its interior end. Rotation of the knob 62 by a meter reader carries the spring arm 63 into engagement with the maximum demand pointer for returning the pointer into engagement with the zero stop 61. At this point, the spring arm 63 slips over the maximum demand pointer to leave the maximum demand pointer free for further actuation by the pusher arm 21. In accordance with the customary practice, the knob 62 may be provided with a seal (not shown).

It will be noted that the register 9 is readily detached through the face plate 15. Although the maximum demand pointer 53 may overlie the register, the pointer may be readily displaced to one side in order to permit detachment or insertion of the register 9.

In operation, the voltage winding 5 and the current windings 6 emit heat. By mounting the measuring device 13 asymmetrically relative to these windings, it is possible to vary the characteristics thereof. For example, the bimetallic spring 17 is heated in accordance with the vector sum of the currents $I_e$ and $I_1$. When heated this spring tends to urge the shaft 20 in a counter-clockwise direction, as viewed in Fig. 2. The bimetallic spring 16 is heated in accordance with the vector difference between the same currents and, when heated, tends to urge the shaft 20 in a clockwise direction, as viewed in Fig. 2. Although the chambers containing the bimetallic springs are well insulated from each other, some heat is transmitted therebetween and the amount of heat transmitted therebetween varies in accordance with the temperature difference between the two chambers. This temperature difference, in turn, is dependent upon the current flowing in the associated circuit. The heat transfer between the chambers may be taken into account when calibrating the maximum demand device. However, if the bimetallic spring 17 is mounted in the path of heat generated by the windings 5 and 6, the heat from these windings tends to compensate for the heat transmitted between the two chambers thereby contributing to a more uniform scale.

As previously pointed out, the fact that the bimetallic springs act in opposition to each other tends to make these springs self-compensating for ambient temperature values. However, ambient temperature effects other parts of the measuring device to introduce possible sources of error. For example, the windings 5 and 26 may vary appreciably in resistance in response to variations in ambient temperatures. Such variations would introduce an error in the maximum demand measuring device readings. The variation in resistance of the windings 5 and 26 may be compensated by proper selection of the materials employed for the heaters 21, 22, 23, and 24.

In the prior art, it has been customary to make heaters for thermal demand units of a material having a low temperature coefficient of resistance, such as Manganin. This was for the purpose of avoiding errors introduced by variations in the resistance of the heaters as the result of temperature changes.

In order to compensate for variations in resistance of the windings 5 and 26, the heaters 21, 22, 23 and 24 may be formed of a material having a high positive temperature coefficient of resistance. The coefficient of the material employed for the heaters is appreciably higher than that of the material (usually copper) employed for the windings 5 and 26. As illustrative of a suitable material, soft iron may be employed for the heaters. Under the influence of ambient temperature changes, the resistance of the windings 5 and 26 may change but the resistance of the heaters 21, 22, 23 and 24 changes by an amount sufficiently great to compensate for the variations in the windings 5 and 26.

In order to permit the adoption of standard printed scales, adjusting means may be provided for the maximum demand measuring device. Such adjusting means may take the form of a lever 64 which is attached to the shaft 20 by means of a set screw 65. The lever 64 is provided with a hole 66 for the reception of one end of a coil spring 67. The remaining end of the spring 67 is attached to a screw 68 which extends through an opening provided in a post 69. The screw 68 may be moved relative to the post 69 by rotation of a thumb nut 70. Attachment of the post 69 to the maximum demand measuring device may be effected in any suitable manner as by a pin 71 which extends through a pillar 72 formed on the base portion 29.

To adjust the maximum demand measuring device, the set screw 65 is loosened to permit the lever 64 to rotate relative to the shaft 20. With the parts in this condition, the maximum demand pointer and the pusher arm 20a are moved to their zero positions whereupon the set screw 65 is actuated into firm engagement with the shaft 20. As a result of this step, the lever aligns itself with the coil spring 67 when the maximum demand pusher arm 20a is in its zero position. Consequently, any adjustment of the spring 67 has no effect upon the zero setting of the maximum demand device.

A known constant load is then applied to the circuit associated with the maximum demand measuring device. If the pointer 53 and the pusher arm 20a fail to take a position corresponding to this known load, the thumb nut 70 is manipulated to vary the tension in the spring 67 until a correct reading is obtained. This completes the adjustment for the device. The adjustment is described more fully in my aforesaid patent.

A somewhat modified construction for the maximum demand measuring device is illustrated in Fig. 4. In this modification, the shaft 20 is provided with two freely rotatable sleeves 73 and 74. The inner end of each of the bimetallic springs 16 and 17 is attached to one of these sleeves 74. The outer end of the bimetallic spring 17 is attached to the shaft 20 in any suitable manner as by a bracket 75. A similar bracket 76 may be employed for attaching the outer end of the bimetallic spring 16 to the sleeve 73.

In operation, the sleeve 73 is maintained in a fixed position in any suitable manner. If the temperature of the bimetallic spring 17 increases, the resulting movement of the outer end of the bimetallic spring operates through the bracket 75 and the shaft 20 to move the pusher arm 20a in a direction to increase the maximum demand reading. If the temperature of the bimetallic spring 16 increases, the inner end of the spring moves relative to the fixed sleeve 73. This movement operates to rotate the sleeve 74, the bimetallic spring 17, the shaft 20 and the pusher arm 20a in a direction opposite to its previously noted rotation. With this construction, the springs at no time are required to exert appreciable forces.

The assembly in Fig. 4 which includes the bimetallic springs 16 and 17 is mounted in a housing which includes a base portion 29a corresponding to the base portion 29 of Figs. 1, 2 and 3. As shown in Fig. 4, the base portion 29a contains two chambers 30a and 31a for reception of the bimetallic springs 16 and 17. These chambers are sufficiently large to receive, in addition, the heaters 21a and 23a, respectively. Each end of each heater projects through the base portion 29a to form a terminal 50a through which connections are made to the heater. If desired, the heater may be coated with insulating varnish or otherwise insulated. The base portion 29a also includes a slot 27a for reception of the bearing 39a which is illustrated as a disk having a centrally disposed bearing opening. It will be noted that the webs 36a connecting the chambers 30a and 31a are positioned substantially higher than the corresponding webs 36 of Fig. 3.

Caps 46a and 47a are provided for the base portion 29a These caps are connected in a unitary structure which may be exactly similar in construction to the base portion 29a. The heaters 21a, 22a, 23a and 24a of Fig. 4 correspond to the heaters 21, 22, 23 and 24 of Fig. 1. Since the installation and operation of the maximum demand measuring device illustrated in Fig. 4 otherwise is similar to that of the demand measuring device shown in Figs. 1, 2 and 3, it is believed that a further description of the construction shown in Fig. 4 is unnecessary.

Part of the subject matter herein disclosed is disclosed and claimed in the copending H. Vassar application, Serial No. 394,260, filed May 20, 1941, and assigned to the same assignee.

Since the invention is susceptible to numerous modifications, the invention is to be restricted only by the appended claims.

I claim as my invention:

1. In a measuring device, a measuring instrument for measuring a variable quantity, said measuring instrument being effective for producing heat during its operation, a pair of thermoresponsive units, means mounting a first one of said thermoresponsive units in the path of heat emitted by said measuring instrument, said means serving to mount the second one of said thermoresponsive units substantially outside the influence of the heat from said measuring instrument, said thermoresponsive means being positioned sufficiently adjacent each other to have some heat transfer therebetween, means for heating said thermoresponsive units differentially in accordance with functions of a quantity to be measured, and means differentially responsive to said thermoresponsive units.

2. In a measuring device, a watthour meter including voltage and current windings, a thermal wattmeter including a pair of thermoresponsive actuating units, means for heating said thermoresponsive actuating units in accordance with a quantity to be measured, said thermal wattmeter having an error in operation which may be compensated by the application of additional heat to one of said actuating units, and means mounting said thermal wattmeter in position for said one of said actuating units to receive substantially more heat than the other of said units from said windings.

3. In a measuring device, a watthour meter including voltage and current windings, a thermal wattmeter including a pair of thermoresponsive actuating units, means for energizing a first one of said units in accordance with the sum of two quantities, means for energizing a second one of said units in accordance with the difference between said two quantities, and means differentially responsive to said units, said thermal wattmeter having an error in operation which may be compensated by the application of additional heat to said first one of said units, and means mounting said thermal wattmeter in position for said first one of said actuating units to receive substantially more heat than the second one of said units from said windings.

4. In a measuring device, a watthour meter including voltage and current windings for measuring electrical energy in an electrical circuit, an enclosure for said watthour meter, a thermal wattmeter positioned within said enclosure and including a pair of thermoresponsive elements positioned to transfer some heat therebetween, and an insulating housing section for each of said thermoresponsive elements, mounting means for positioning the housing section of a first one only of said thermoresponsive elements substantially in the path of heat emanating from said windings, means energized in part from said windings for heating said first one of said thermoresponsive elements in accordance with the sum of voltage and current in said electrical circuit, said last named means being effective for heating the second one of said thermoresponsive elements in accordance with the difference between said voltage and current, and means differentially responsive to said thermoresponsive elements.

5. In a measuring device, a pair of thermoresponsive elements designed to coact for the purpose of measuring a variable quantity, and a housing for said thermoresponsive elements comprising a unitary, homogeneous heat insulating housing base provided with spaced chambers for said thermoresponsive elements, heat insulating cover means for said chambers, and connecting means for said thermoresponsive elements, said connecting means being disposed between said housing base and said cover means to permit withdrawal of said thermoresponsive elements from said housing base as a unit when said cover means is removed to expose said chambers.

6. In a measuring device, a pair of thermoresponsive elements designed to coact for the purpose of measuring a variable quantity, and a housing for said thermoresponsive elements comprising a unitary, homogeneous heat insulating housing base provided with spaced chambers for said thermoresponsive elements, said housing base including a portion between said chambers of substantially reduced cross-section for reducing the transmission of heat between said chambers through the insulating material of said housing base, heat insulating cover means for said chambers, and connecting means for said thermoresponsive elements, said connecting means being disposed between said housing base and said cover means to permit withdrawal of said thermoresponsive elements from said housing base as a unit when said cover means is removed to expose said chambers.

7. In a measuring device, a pair of thermoresponsive elements designed to coact for the purpose of measuring a variable quantity, a plurality of heaters for heating said thermoresponsive elements, and a housing for said thermoresponsive elements and heaters comprising a unitary, homogeneous heat insulating housing base provided with spaced chambers for said thermoresponsive elements and heaters, said housing base including a portion between said chambers of substantially reduced cross-section for reducing the transmission of heat between said chambers through the insulating material of said housing base, and heat insulating cover means for said chambers, and connecting means for said thermoresponsive elements, said connecting means being disposed between said housing base and said cover means to permit withdrawal of said thermoresponsive elements from said housing base as a unit when said cover means is removed to expose said chambers.

8. In a measuring device, a pair of thermoresponsive elements designed to coact for the purpose of measuring a variable quantity, a plurality of heaters for heating said thermoresponsive elements, and a housing for said thermoresponsive elements and heaters comprising a unitary, homogeneous heat insulating housing base provided with spaced chambers for said thermoresponsive elements and heaters, detachable heat insulating cover means for said chambers, heating means carried by said cover means for heating said thermoresponsive elements, and connecting means for said thermoresponsive elements, said connecting means being disposed between said housing base and said cover means to permit withdrawal of said thermoresponsive elements from said housing base as a unit when said cover means is removed to expose said chambers.

9. In a measuring device, a pair of thermoresponsive elements designed to coact for the purpose of measuring a variable quantity, and a housing for said thermoresponsive elements comprising a unitary, homogeneous heat insulating housing base provided with spaced chambers for said thermoresponsive elements, detachable heat insulating cover means for said chambers, shaft means attached to said thermoresponsive elements for actuation thereby and disposed between said cover means and said housing base, and bearing means for said shaft means removably carried by said housing, said thermoresponsive elements and shaft means being removable as a single assembly from said housing base when said cover means is detached from said housing base.

10. In a measuring device, an actuating assembly including a shaft, a pair of spiral, bimetallic thermoresponsive elements spaced along said shaft, said thermoresponsive elements being disposed when mounted in operative condition for urging said shaft in opposite directions in response to a variation in temperature thereof, and a housing for said actuating assembly comprising a unitary, homogeneous heat insulating housing base provided with spaced chambers, each of said chambers being proportioned to receive a portion of a separate one of said thermoresponsive elements, bearing means for said shaft, said housing base being recessed for detachably receiving and positioning said bearing means, and heat insulating cover means for substantially completing the heat insulating enclosure for each of said thermoresponsive elements when the thermoresponsive elements are positioned in said housing base, said cover means being removable independently of said housing base, whereby the thermal responsive element and said shaft are accessible for removal or adjusting.

11. In a measuring device, a pair of thermoresponsive units, means for heating said thermoresponsive units respectively in accordance with the sum and difference of two variable quantities, and means differentially responsive to said thermoresponsive units comprising a member responsive to a first one of said thermoresponsive units for actuation in a first direction relative to a predetermined support, and means responsive to a second one of said thermoresponsive units for actuating both said member and the entire first one of said thermoresponsive units in a second direction.

12. In a measuring device, a pair of thermoresponsive units each having a support and a portion movable relative to said support, means for heating said thermoresponsive units respectively in accordance with the sum and difference of two variable quantities, and means differentially responsive to said thermoresponsive units comprising a member responsive to said first one of said thermoresponsive units for actuation in a first direction relative to the support of said last-named thermoresponsive unit, and means responsive to a second one of said thermoresponsive units for moving the support of said first one of said thermoresponsive units relative to the support of the second one of said thermoresponsive units.

13. In a thermal device responsive to a variable quantity; an actuating assembly comprising a shaft, a pair of thermoresponsive means for actuating said shaft, and means connecting said thermoresponsive means to said shaft at axially spaced positions; a housing formed of insulating material for said actuating assembly, said housing comprising a base section and a cover section separable in a direction substantially transverse to said shaft, and means associated with said housing for mounting said shaft for rotation therein intermediate said sections, said housing having spaced chambers for receiving said thermoresponsive means configured to permit withdrawal of said actuating assembly therefrom as a unit in a direction substantially transverse to said shaft when said sections are separated.

14. In a thermal device responsive to a variable quantity; an actuating assembly comprising a shaft, a pair of thermoresponsive means for actuating said shaft, and means connecting said thermoresponsive means to said shaft at axially spaced positions; a housing formed of insulating material for said actuating assembly, said housing comprising a base section and a cover section separable in a direction substantially transverse to said shaft, bearing means associated with said housing for mounting said shaft for rotation therein intermediate said sections, said housing having spaced chambers for receiving said thermoresponsive means and bearing means configured to permit withdrawal of said actuating assembly therefrom as a unit in a direction substantially transverse to said shaft when said sections are separated, and electrical heating means positioned in said housing for heating said thermoresponsive means in accordance with an electrical quantity to be measured, said heating means having terminals extending exteriorly of said housing.

15. In a thermal device responsive to a variable quantity; an actuating assembly comprising a shaft, a pair of thermoresponsive means for actuating said shaft, and means connecting said thermoresponsive means to said shaft at axially spaced positions; a housing formed of insulating material for said actuating assembly, said housing comprising a unitary base section and a cover section separable in a direction substantially transverse to said shaft, and means associated with said housing for mounting said shaft for rotation therein intermediate said sections, said housing having spaced chambers for receiving said thermoresponsive means configured to permit withdrawal of said actuating assembly therefrom as a unit in a direction substantially transverse to said shaft when said sections are separated, and said housing having a reduced cross-section intermediate said chambers for restricting the heat transfer therebetween.

BENJAMIN H. SMITH.